Patented Apr. 20, 1948

2,440,050

UNITED STATES PATENT OFFICE 2,440,050

RIBOFLAVIN SOLUTION

Albert Ensign Knauf and Frederick Joseph Kirchmeyer, Waukegan, Ill., assignors to Abbott Laboratories, a corporation of Illinois No Drawing. Application May 13, 1944,
Serial No. 535,552

3 Claims. (Cl. 167—81)

This invention relates to solutions containing a polyhydroxy-isoalloxazine as an essential ingredient. More specifically it refers to solutions which contain riboflavin and are intended for parenteral use.

Riboflavin, being one of the vitamins, is of great interest to the medical profession and pharmaceutical industry. It may be given in solid form as tablets or capsules, but is for some purposes desired in solution form for parenteral injection. Great difficulty has been encountered in preparing solutions of desired concentration because of the very slight solubility of riboflavin in any of the common solvents, especially those of low toxicity which are suitable for injection. Only one part of riboflavin will dissolve in 9000 parts of water at 25° C. (11 mgm. in 100 cc.). It is even less soluble in alcohol. It is sparingly soluble in phenol, amyl acetate, and cyclohexanol, but these solvents are too toxic for therapeutic use.

Various means of producing riboflavin solutions have been tried, but all possess disadvantages. Solution can be effected by means of alkali, but the alkaline solutions of riboflavin deteriorate rapidly. Urea aids solution but gradually hydrolyzes to an ammonium salt which causes the solution to turn alkaline with consequent destruction of riboflavin. Nicotinamide aids solution but introduces its own therapeutic effect which may be undesirable in some cases. Some samples of nicotinamide are alkaline and would cause deterioration of riboflavin. With increasing acidity necessary for stability of several members of the B complex, the solubilizing effect of nicotinamide decreases rapidly.

It has been found that mixtures of veratryl alcohol (3,4 dimethoxy benzyl alcohol) and water have remarkable power of dissolving riboflavin. As mentioned above, 1 part of riboflavin requires 9000 parts of water for solution at 25° C., but one part of riboflavin is soluble in 900 parts of a 1% aqueous solution of veratryl alcohol, or 335 parts of 4% solution, or in 174 parts of a 10% solution, or in 117 parts of a 15% solution. Higher concentrations of veratryl alcohol dissolve more riboflavin but may be less desirable for parenteral use than the lower concentrations of veratryl alcohol. The resulting solution does not crystallize on standing, is physically and chemically stable, and can be administered in quantities which are therapeutically effective without toxic reactions. Aqueous solutions of veratryl alcohol have very little irritating or toxic effect, and a 1% solution has virtually none. In addition to its action as a solvent for riboflavin, veratryl alcohol also exerts a bacterio-static effect similar to that of phenol or benzyl alcohol and its presence is, therefore, desirable, especially in multiple dose containers.

Example I 100 mg. of riboflavin, 1 cc. of veratryl alcohol and 8 cc. of water were warmed until the solid dissolved. This solution was then diluted with water to 100 cc.

Example II 300 mg. of riboflavin, 4 cc. veratryl alcohol, and about 30 cc. of water were warmed together until solution was effected and then diluted to 100 cc. with water.

Example III 40 mg. of d-araboflavin (6,7 dimethyl-9-araboflavin), 0.4 cc. of veratryl alcohol, and 4 cc. of water were warmed until solution was effected and then diluted to 25 cc. with water.

Example IV 10 grams nicotinamide, 0.3 gram riboflavin, 1 cc. veratryl alcohol and about 25 cc. water were warmed until solution was effected. This solution is diluted to 95 cc. with water and to it is added 1 gram thiamin chloride, 1.1 gram pyridoxine hydrochloride and sufficient hydrochloric acid to adjust the pH to 4.1. Sufficient water is then added to bring the total volume to 100 cc. Although nicotinamide does exert some solubilizing effect, this effect is greatly reduced at a pH of 4.1 and the presence of veratryl alcohol is necessary to keep this amount of riboflavin in solution.

It will be obvious to those skilled in the art that other substances such as medicinals, flavors, colors, etc., which are not incompatible with riboflavin or the other 9-polyhydroxy isoalloxazines may be added in the above examples.

Without further elaboration, the foregoing will so fully explain our invention that others may readily adapt the same for use under various conditions of service.

We claim:

1. A therapeutic solution comprising riboflavin in a concentration greater than 0.011%, veratryl alcohol and water.

2. A therapeutic solution comprising a 9-polyhydroxy isoalloxazine, in a concentration greater than 0.011%, veratryl alcohol and water.

3. An improved therapeutic solution comprising water, veratryl alcohol not less than 1% nor more than 4%, and riboflavin not less than ten times as much as would dissolve in water alone.

ALBERT ENSIGN KNAUF.
FREDERICK JOSEPH KIRCHMEYER.

REFERENCES CITED

The following references are of record in the file of this patent:

UNITED STATES PATENTS

| Number | Name | Date |
|---|---|---|
| 2,244,277 | Wenner | June 3, 1941 |
| 2,256,604 | Auhagen | Sept. 23, 1941 |
| 2,349,986 | Preiswerk | May 3, 1944 |

FOREIGN PATENTS

| Number | Country | Date |
|---|---|---|
| 678,115 | Germany | July 8, 1939 |